United States Patent
Ryu et al.

(10) Patent No.: US 11,627,562 B2
(45) Date of Patent: Apr. 11, 2023

(54) MULTI-PANEL ACTIVATION/DEACTIVATION STATUS REPORTING

(71) Applicant: QUALCOMM Incorporated, San Diego, CA (US)

(72) Inventors: Jung Ho Ryu, Fort Lee, NJ (US); Tianyang Bai, Bridgewater, NJ (US); Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/869,169

(22) Filed: May 7, 2020

(65) Prior Publication Data

US 2020/0358585 A1    Nov. 12, 2020

Related U.S. Application Data

(60) Provisional application No. 62/846,368, filed on May 10, 2019.

(51) Int. Cl.
*H04W 72/04* (2009.01)
*H04L 5/00* (2006.01)
(Continued)

(52) U.S. Cl.
CPC ..... *H04W 72/0413* (2013.01); *H04W 72/042* (2013.01); *H04L 5/001* (2013.01);
(Continued)

(58) Field of Classification Search
CPC ............ H04W 72/042; H04W 72/0413
See application file for complete search history.

(56) References Cited

U.S. PATENT DOCUMENTS

2010/0279625 A1    11/2010    Ko et al.
2018/0205419 A1    7/2018    Zhou et al.
(Continued)

FOREIGN PATENT DOCUMENTS

WO    2019032997 A1    2/2019

OTHER PUBLICATIONS

International Search Report and Written Opinion—PCT/US2020/032232—ISA/EPO—dated Jul. 21, 2020.
(Continued)

*Primary Examiner* — Kevin C. Harper
(74) *Attorney, Agent, or Firm* — Arent Fox, LLP

(57) ABSTRACT

The present disclosure provides signaling for multi-panel user equipment (MPUE) activation and deactivation status. The MPUE may include a plurality of panels. The MPUE may determine a number of active panels. The MPUE may transmit a status message indicating at least the number of active panels to a base station. The base station may schedule a communication with the UE for at least one panel of the number of active panels. The MPUE may receive from the base station, a downlink control information (DCI) scheduling a communication for at least one of the number of active panels. The MPUE may communicate according to the DCI using the at least one panel scheduled by the DCI. In another aspect, the MPUE may indicate a nominal number of active panels and implicitly manage a mapping of panel identifiers to an actual number of active panels.

18 Claims, 12 Drawing Sheets

(51) Int. Cl.
　　　*H04W 76/11*　　　(2018.01)
　　　*H04W 76/27*　　　(2018.01)
　　　*H04W 72/0453*　　(2023.01)

(52) U.S. Cl.
　　　CPC .......... *H04L 5/0053* (2013.01); *H04L 5/0096* (2013.01); *H04L 5/0098* (2013.01); *H04W 72/0453* (2013.01); *H04W 76/11* (2018.02); *H04W 76/27* (2018.02)

(56) References Cited

U.S. PATENT DOCUMENTS

| | | | |
|---|---|---|---|
| 2019/0028167 A1 | 1/2019 | Chang et al. | |
| 2019/0090227 A1 | 3/2019 | Tsai et al. | |
| 2020/0029274 A1* | 1/2020 | Cheng | H04B 17/309 |
| 2020/0106168 A1* | 4/2020 | Hakola | G06F 1/1698 |
| 2020/0267712 A1 | 8/2020 | Cirik et al. | |
| 2020/0358583 A1 | 11/2020 | Ryu et al. | |
| 2020/0413363 A1 | 12/2020 | Park et al. | |
| 2021/0168714 A1 | 6/2021 | Guan et al. | |
| 2021/0211957 A1 | 7/2021 | Kamohara et al. | |

OTHER PUBLICATIONS

LG Electronics: "Discussion on Multi-Beam based Operation and Enhancements", 3GPP Draft, 3GPP TSG RAN WG1 Meeting #97, R1-1906731 Multi-Beam_Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019, XP051708767, 13 Pages, Retrieved from the internet: URL: http://www.3gpp.org/ftp/tsg%5Fran/WG1%5FRL1/TSGR1%5F97/Docs/R1%2D1906731%2Ezip, [retrieved on May 4, 2019], Section 2.

Mediatek Inc: "Enhancements on Multi-Beam Operation", 3GPP Draft, 3GPP TSG RAN WG1 #97, R1-1906537 Multi-Beam Operation_Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051708573, 13 pages, Retrieved from the internet: URL: http://www.3gpp.org/ftp/tsg%5Fran/WG1%5FRL1/TSGR1%5F97/Docs/R1%2D1906537%2Ezip, [retrieved on May 4, 2019], Section 2.1.

Vivo: "Further Discussion on Multi-Beam Operation", 3GPP Draft, 3GPP TSG RAN WG1 #97, R1-1906160_Further Discussion on Multi-Beam Operation, 3rd Generation Partnership Project (3gpp), Mobile Competence Centre, 650, Route Des Lucioles, F-06921 Sophia-Antipolis Cedex, Fran, vol. RAN WG1, No. Reno, USA, May 13, 2019-May 17, 2019, May 1, 2019 (May 1, 2019), XP051708201, 9 pages, Retrieved from the Internet: URL: http://www.3gpp.org/ftp/tsg%5Fran/WG1%5FRL1/TSGR1%5F97/Docs/R1%2D1906160%2Ezip, [retrieved on May 1, 2019], Section 3.

ZTE: "Enhancement on Multi-Beam Operation", 3GPP Draft, 3GPP TSG RAN WG1 Meeting #97, R1-1906237, Enhancement on Multi-Beam Operation, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 4, 2019 (May 4, 2019), XP051708275, 18 Pages, Retrieved from the internet: URL: http://www.3gpp.org/ftp/tsg%5Fran/WG1%5FRL1/TSGR1%5F97/Docs/R1%2D1906237%2Ezip, [retrieved on May 4, 2019], Section 2.1.

* cited by examiner

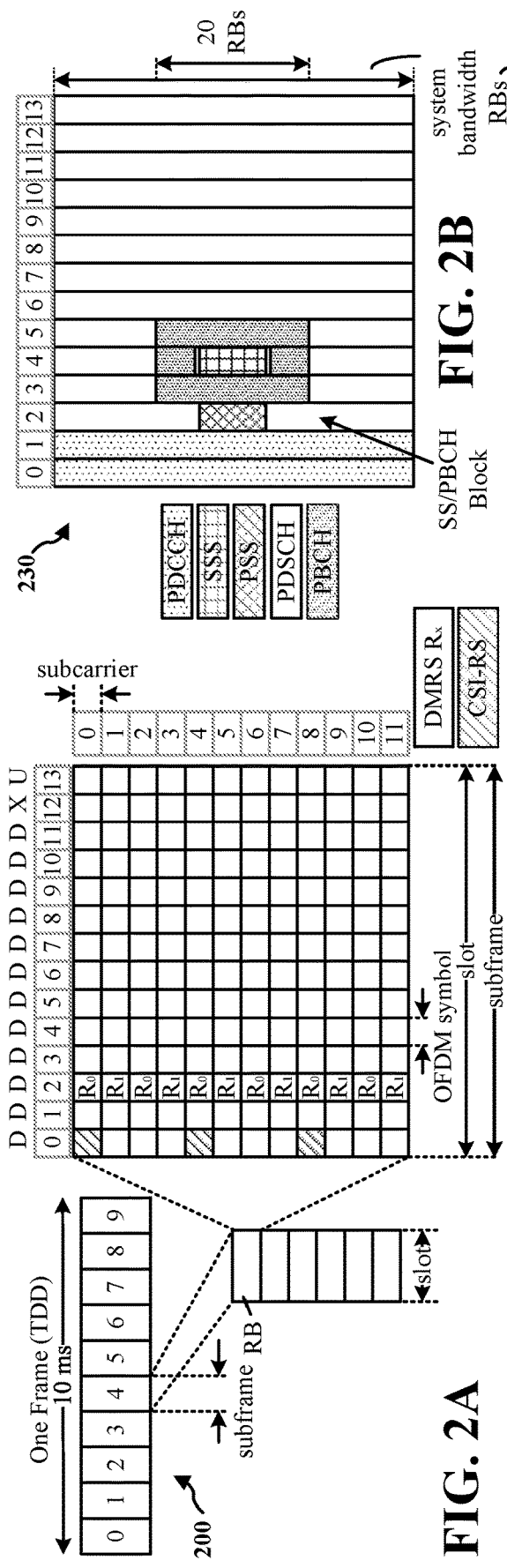
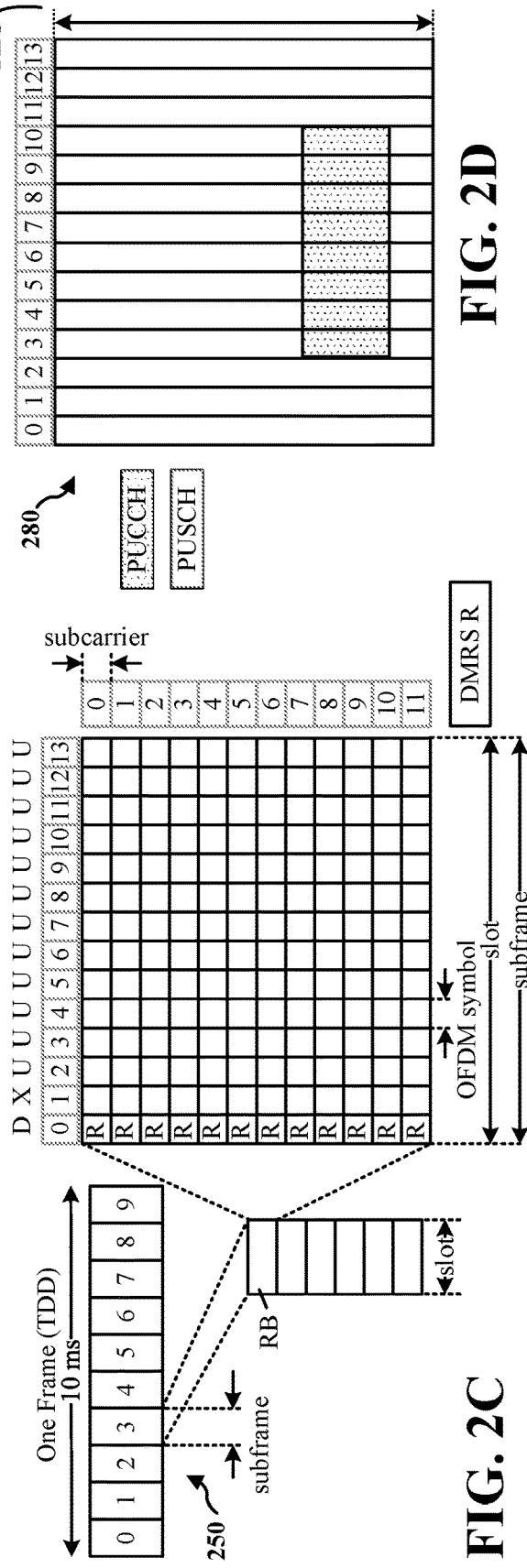
FIG. 2A  FIG. 2B  FIG. 2C  FIG. 2D

MULTI-PANEL ACTIVATION/DEACTIVATION STATUS REPORTING

CLAIM OF PRIORITY UNDER 35 U.S.C. § 119

This application claims priority to U.S. Provisional Application No. 62/846,368 titled "MULTI-PANEL ACTIVATION/DEACTIVATION STATUS REPORTING," filed May 10, 2019, which is assigned to the assignee hereof, and incorporated herein by reference in its entirety.

BACKGROUND

Technical Field

The present disclosure relates generally to communication systems, and more particularly, to user equipment (UE) having multiple panels.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium storing executable instructions to perform the first method, and an apparatus (e.g., a user equipment (UE)) configured to execute the first method are provided. The method may include determining, at a UE having a plurality of panels, a number of active panels. The method may include transmitting, from the UE to a base station, a status message indicating at least the number of active panels. The method may include receiving, from the base station, a downlink control information (DCI) scheduling a communication for at least one of the number of active panels. The method may include communicating according to the DCI using the at least one panel scheduled by the DCI.

The apparatus may include a memory storing computer-executable instructions and at least one processor coupled with the memory and configured to execute the instructions. The at least one processor may be configured to determine, at a UE having a plurality of panels, a number of active panels. The at least one processor may be configured to transmit, from the UE to a base station, a status message indicating at least the number of active panels. The at least one processor may be configured to receive, from the base station, a downlink control information (DCI) scheduling a communication for at least one panel of the number of active panels. The at least one processor may be configured to communicate according to the DCI using the at least one panel scheduled by the DCI. Also, an apparatus may include means for performing the first method.

In another aspect, a second method, non-transitory computer-readable medium storing executable instructions to perform the second method, and an apparatus (e.g., a UE) configured to execute the second method are provided. The second method may include determining, at a UE having a plurality of panels, a nominal number of active panels. The second method may include mapping, by the UE, a number of panel identifiers equal to the nominal number of active panels to an actual number of active panels of the plurality of panels. The second method may include receiving, from the base station, a DCI scheduling a communication based on one of the panel identifiers. The second method may include determining a panel for the communication based on the mapping. The second method may include communicating according to the DCI using the determined panel. The apparatus may include a memory storing computer-executable instructions and at least one processor coupled with the memory and configured to execute the instructions to perform the second method. Also, an apparatus may include means for performing the second method.

In another aspect, a third method, non-transitory computer-readable medium storing executable instructions to perform the third method, and apparatus (e.g., a base station) configured to execute the third method are provided. The third method may include receiving, at a base station from a UE having a plurality of panels, a status message indicating at least a number of active panels. The third method may include determining at least one panel of the number of active panels to schedule for a communication. The third method may include transmitting, from the base station, a DCI scheduling the communication for the at least one panel.

The apparatus may include a memory storing computer-executable instructions and at least one processor coupled with the memory and configured to execute the instructions. The at least one processor may be configured to receive, at a base station from a UE having a plurality of panels, a status message indicating at least a number of active panels. The at least one processor may be configured to determine at least one panel of the number of active panels to schedule for a communication. The at least one processor may be configured to transmit, from the base station, a DCI scheduling the communication for the at least one panel. Also, an apparatus may include means for performing the third method.

In another aspect, a fourth method, non-transitory computer-readable medium storing executable instructions to perform the fourth method, and an apparatus (e.g., a UE) configured to execute the fourth method are provided. The fourth method may include determining, at a base station a nominal number of active panels for a UE having a plurality of panels. The fourth method may include determining at least one panel of the nominal number of active panels to schedule for a communication. The fourth method may include transmitting, from the base station, a DCI scheduling a communication for a panel identifier corresponding to one of the nominal number of active panels. The apparatus may include a memory storing computer-executable instructions and at least one processor coupled with the memory and configured to execute the instructions to perform the fourth method. Also, an apparatus may include means for performing the fourth method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of a 5G/NR subframe.

DETAILED DESCRIPTION

Figure 1:
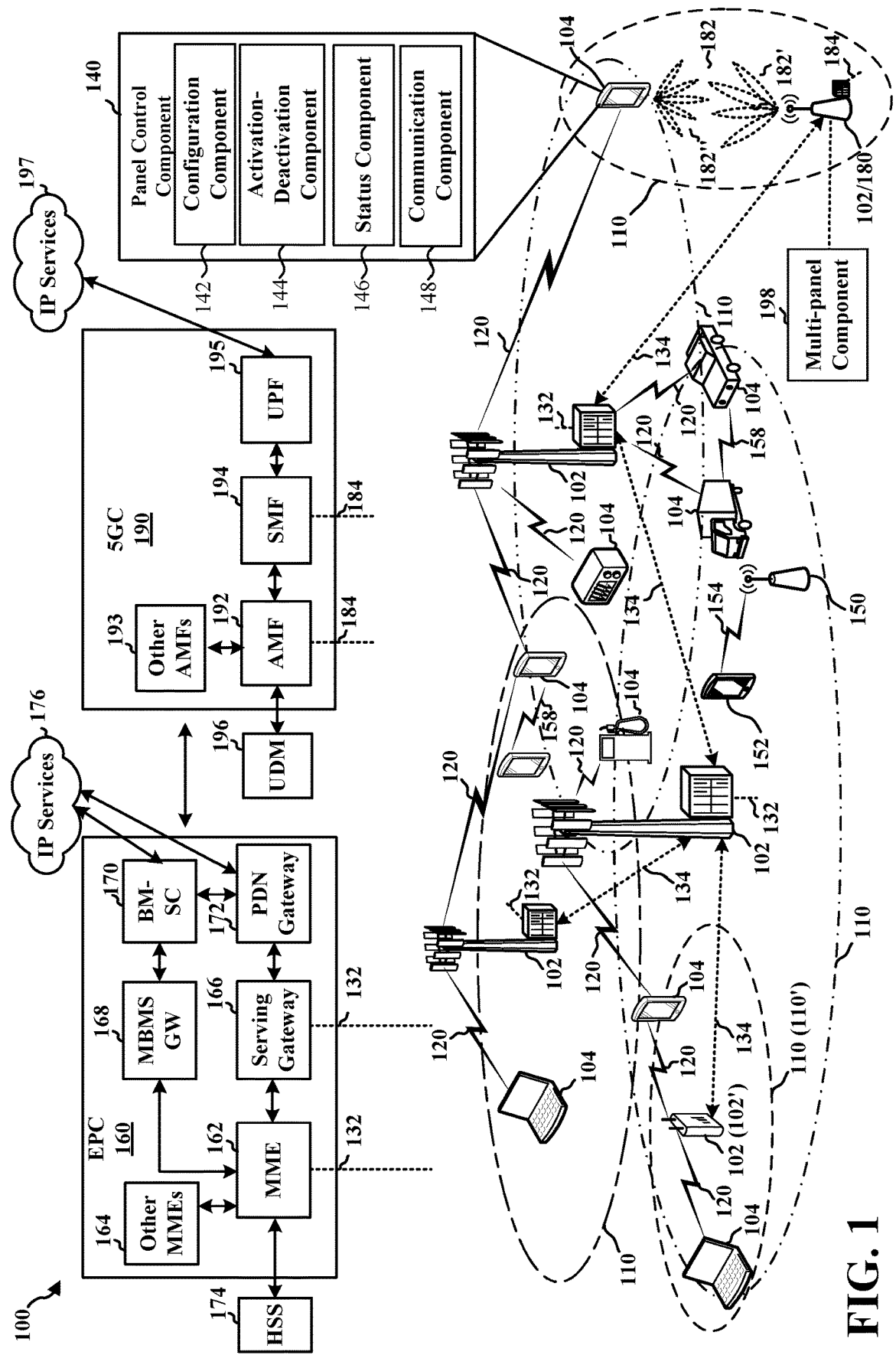
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A multi-panel UE (MPUE) may be a UE that includes multiple panels. The terms MPUE and UE may be used interchangeably. An example of an MPUE may include a folding device that includes physical panels that fold with respect to each other. From a wireless communications perspective, however, the concept of an MPUE may be broader and may include any device with multiple antenna groups configured as panels. That is, an MPUE may not be limited to a particular form factor.

An MPUE may provide flexibility in selection of antennas for wireless communications. In particular, the concept of a panel may be used to activate or deactivate certain antennas in order to improve performance and/or save battery power. Generally, multiple panels may be activated at the same time, but a UE does not need to activate multiple panels. In an aspect, although multiple panels may be active, one panel may be selected for uplink transmission using a single beam. In other aspects, multiple beams may be transmitted from multiple panels, or multiple beams may be transmitted from one panel.

In an aspect, an MPUE may control activation and/or deactivation of a panel. For example, the UE may activate or deactivate panels based on power consumption and maximum permissible exposure (MPE). Improvements in signaling between an MPUE and a base station may be desired to coordinate activation and deactivation of the panels and to select transmission properties corresponding to the active panels.

In an aspect, the present disclosure provides signaling mechanisms that allow both the base station and the MPUE to be aware of a current panel status for facilitating communications. When connecting to a base station or after changing a panel activation status, an MPUE may transmit a panel status. In a first implementation, the panel status may explicitly indicate a number of active panels. In a second implementation, the panel status may explicitly indicate an activation status for each panel. In a third implementation, the number of active panels for a MPUE may be fixed and the MPUE may map panel identifiers to active panels. The base station may use the panel status for scheduling to determine when a panel is capable of a communication. The base station may transmit a downlink control information (DCI) indicating which panel to use for a communication in either the uplink direction or downlink direction. In an aspect, the base station may transmit an activation or deactivation command to initiate an activation or deactivation process for a panel of the MPUE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and one or more core networks such as an Evolved Packet Core (EPC) 160 and/or a 5G Core (5GC) 190. The base stations 102 may include macrocells (high power cellular base station) and/or small cells (low power cellular base station). The macrocells include base stations. The small cells include femtocells, picocells, and microcells.

One or more of the UEs 104 may be an MPUE including at least a first panel and a second panel and a panel control component 140. The panel control component 140 may control activation and deactivation of the panels and perform signaling regarding the configuration and status of the panels. For example, the panel control component 140 may include one or more of a configuration component 142, an activation-deactivation component 144, a status component 146, and a communication component 148. The configuration component 142 may transmit a panel configuration or UE capability indicating a number of panels of the UE 104.

The activation-deactivation component 144 may determine to activate an inactive panel and performs an activation process for the inactive panel. The activation-deactivation component 144 may determine to deactivate an active panel and perform a deactivation process for the active panel. The status component 146 may transmit a status message indicating either a number of active panels or an activation status of each of the panels. The communication component 148 may receive a DCI scheduling a communication for a panel and transmit or receive the communication according to the DCI.

Figure 12:
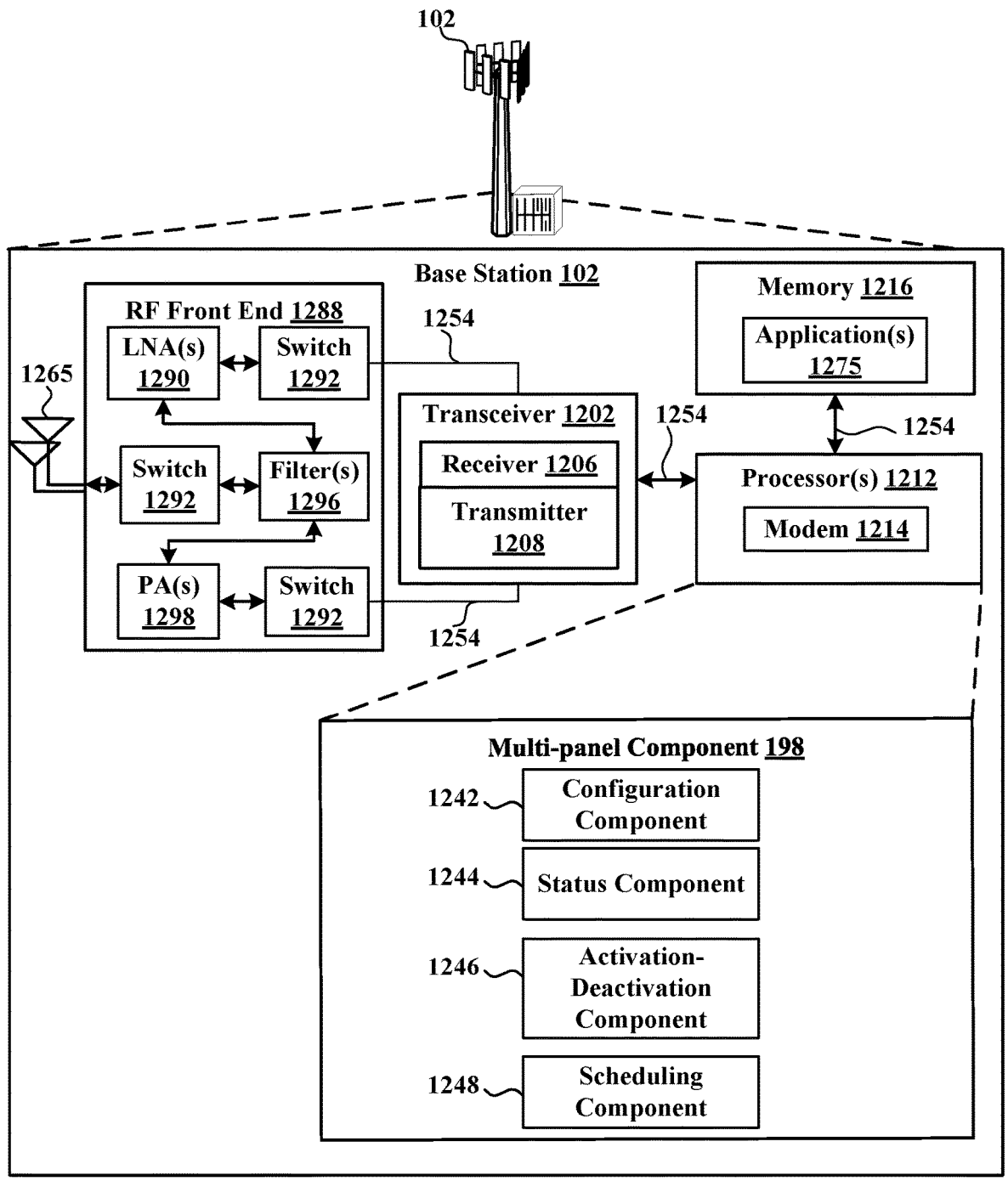
FIG. 12 is a schematic diagram of example components of the base station of FIG. 1.

A base station 102 in communication with the UE 104 may include a multi-panel component 198 that communicates with the panel control component 140 regarding an activation status of a plurality of panels. For example, as illustrated in FIG. 12, the multi-panel component 198 may include one or more of a configuration component 1242, a status component 1244, an activation-deactivation component 1246, and a scheduling component 1248. The configuration component 1242 may receive configuration information such as a total number of panels or a nominal number of active panels. The status component 1244 may receive a status indicating a number of active panels and/or an activation status for each panel of the UE 104. The activation-deactivation component 1246 may determine an activation or deactivation of one or more panels. The scheduling component 1248 may determine one or more panels to schedule for a communication and transmit a DCI scheduling the communication. Further details of the multi-panel component 198 are described below.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
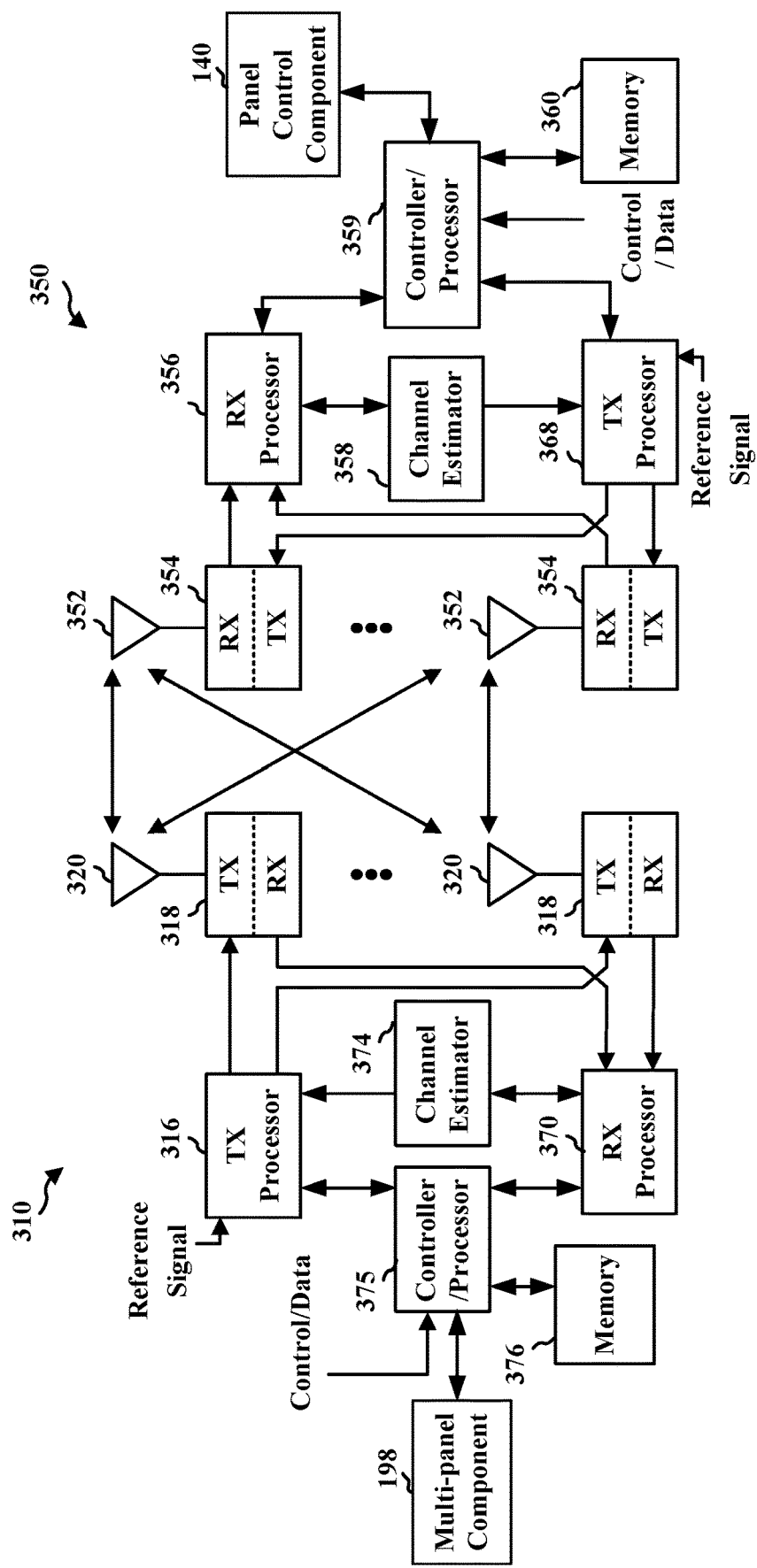
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 and or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the panel control component 140 of FIG. 1.

At least one of the TX processor 316, the RX processor 370, and the controller/processor 375 may be configured to perform aspects in connection with the multi-panel component 198 of FIG. 1.

Figure 4:
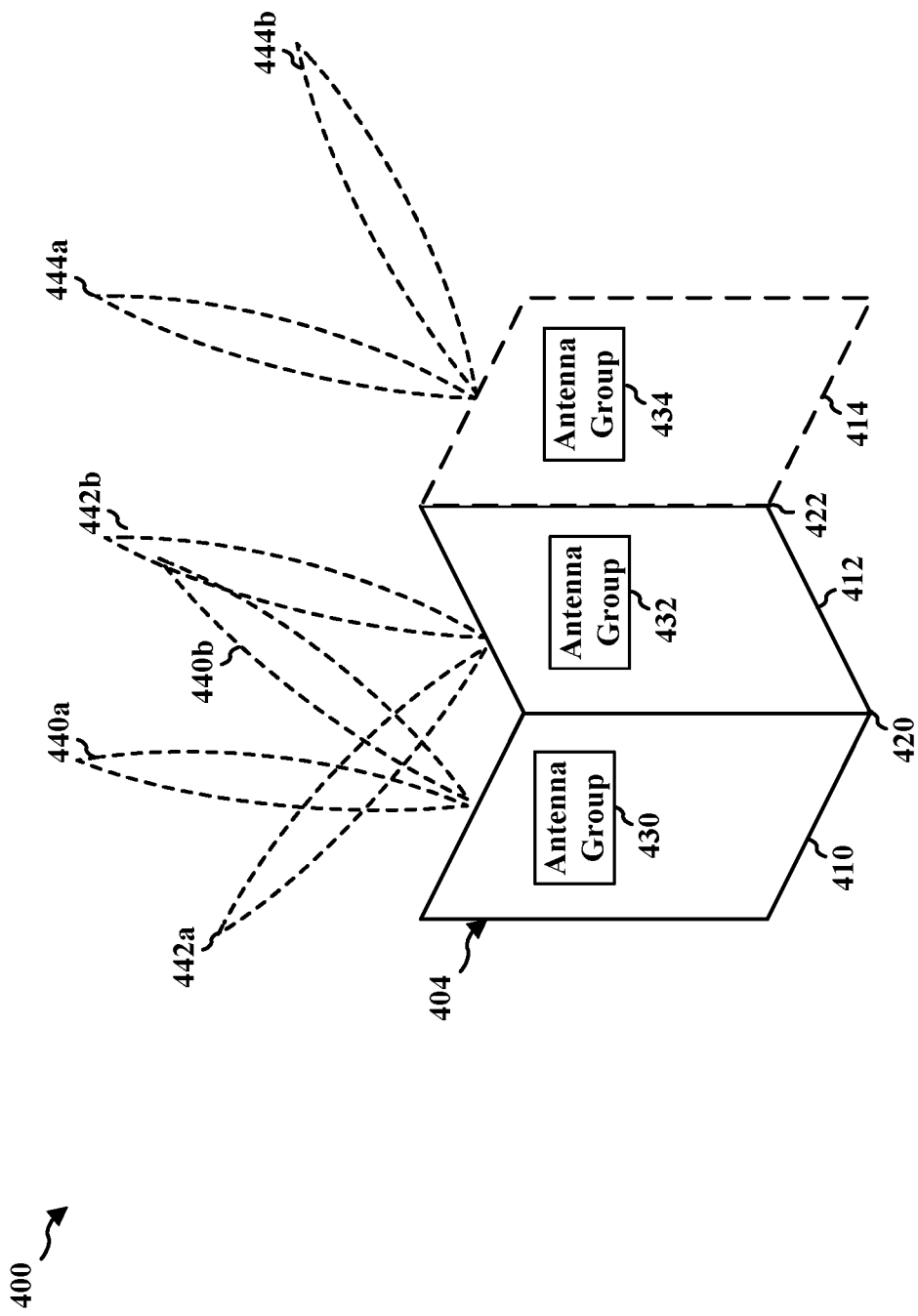
FIG. 4 is a conceptual diagram of a first example multi-panel UE.

Turning to FIG. 4 a conceptual diagram 400 includes an example multi-panel UE (MPUE) 404. The MPUE 404 may include multiple panels such as a first panel 410, a second panel 412, an optional third panel 414. The MPUE 404 may include additional optional panels (not shown). Generally, a panel may be a component of a UE including an antenna group including one or more antennas and associated with a panel ID. An antenna may include one or more antennas, antenna elements, and/or antenna arrays. Each panel may operate with a degree of independence. For example, each panel may be individually activated or deactivated. An activated panel may be used for transmission and/or reception. A deactivated panel may not be used for transmission and/or reception. For example, a deactivated panel may be in a sleep mode that saves power. In an aspect, a deactivated panel may be in a light sleep mode or a deep sleep mode. Each panel may be configured with a different panel identifier (panel ID). In an aspect, a panel may be associated with an antenna group. For example, the panel 410 may be associated with the antenna group 430, the panel 412 may be associated with the antenna group 432, and the panel 414 may be associated with the antenna group 434.

In an aspect, a panel may be a unit of an antenna group to control beams independently. For example, within a panel, one beam can be selected and used for UL transmission. For example, one of the beams 440a, 440b may be selected for panel 410. In an aspect, a UE may be limited to a single panel for UL transmission. In another aspect, multiple panels may be used for UL transmission and across different panels, multiple beams (each selected per panel) may be used for UL transmission. For example, one of the beams 442a, 442b may be selected for panel 412, and one of the beams 444a, 444b may be selected for panel 414. In another aspect, multiple beams may be transmitted from the same panel. For example, the panel 410 may transmit both of the beam 440a and the beam 440b. A limited number of beams is illustrated for simplicity, but it should be understood that a panel may select from a larger number of beams, for example, depending on a frequency range of the transmission.

In an aspect, a panel may be a unit of an antenna group to control transmission power for the antenna group. For example, all antennas or antenna elements within the antenna group may use the same transmission power.

In an aspect, a panel may be a unit of an antenna group having a common UL timing. For example, all antennas or antenna elements within the antenna group may be configured with the same timing advance.

In an aspect, the panels of the MPUE 404 may be based on a hardware structure of the MPUE 404. For example, the MPUE 404 may include a hinge 420 between the panel 410 and the panel 412 such that the panel 410 and panel 412 may be oriented at an angle with respect to each other. Similarly, a hinge 422 may be located between the panel 412 and the panel 414. In an aspect, the panels 410, 412, 414 may be physically reconfigured (e.g., by folding the MPUE 404 at a hinge 420, 422) to change the orientation of the panels. The direction of the beams associated with each panel may also change when the panels 410, 412, 414 are physically reconfigured.

Figure 5:
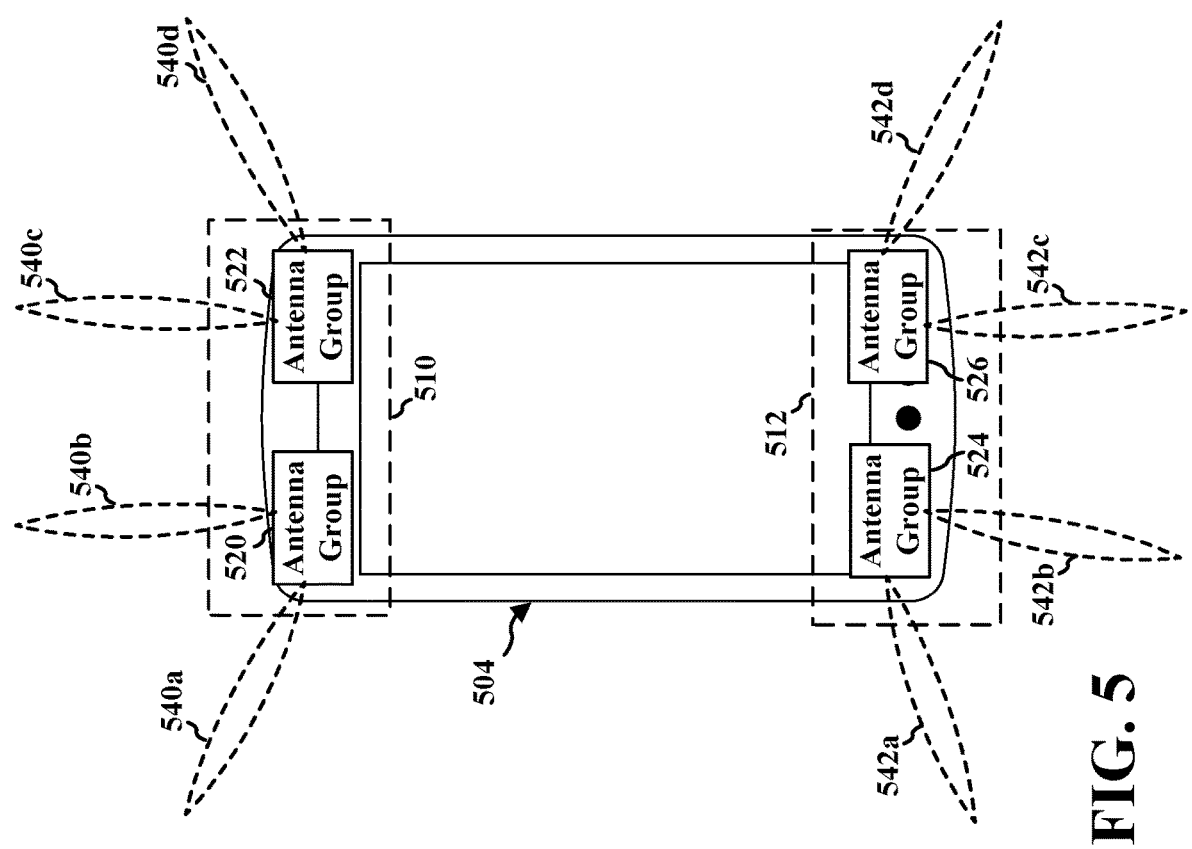
FIG. 5 is a conceptual diagram of a second example multi-panel UE.

In another aspect, the panels of the MPUE 404 may be dynamically defined, for example by selecting a subset of the total antennas or antenna elements as a panel. For example, FIG. 5 illustrates an example MPUE 504 that does not necessarily include hinges. The MPUE 504 may include multiple antenna groups 520, 522, 524, 526. The MPUE 504 may configure the antenna groups 520, 522, 524, 526 into multiple panels. For example, a first panel 510 may include antenna groups 520 and 522 and a second panel 512 may include antenna groups 524 and 526. When the first panel 510 is active, one of the beams 540a, 540b, 540c, 540d may be selected for uplink transmission. When the second panel 512 is active, one of the beams 542a, 542b, 542c, or 542d may be selected for uplink transmission. In an aspect, the MPUE 504 may dynamically configure panels including different combinations of the antenna groups 520, 522, 524, 526.

Figure 6:
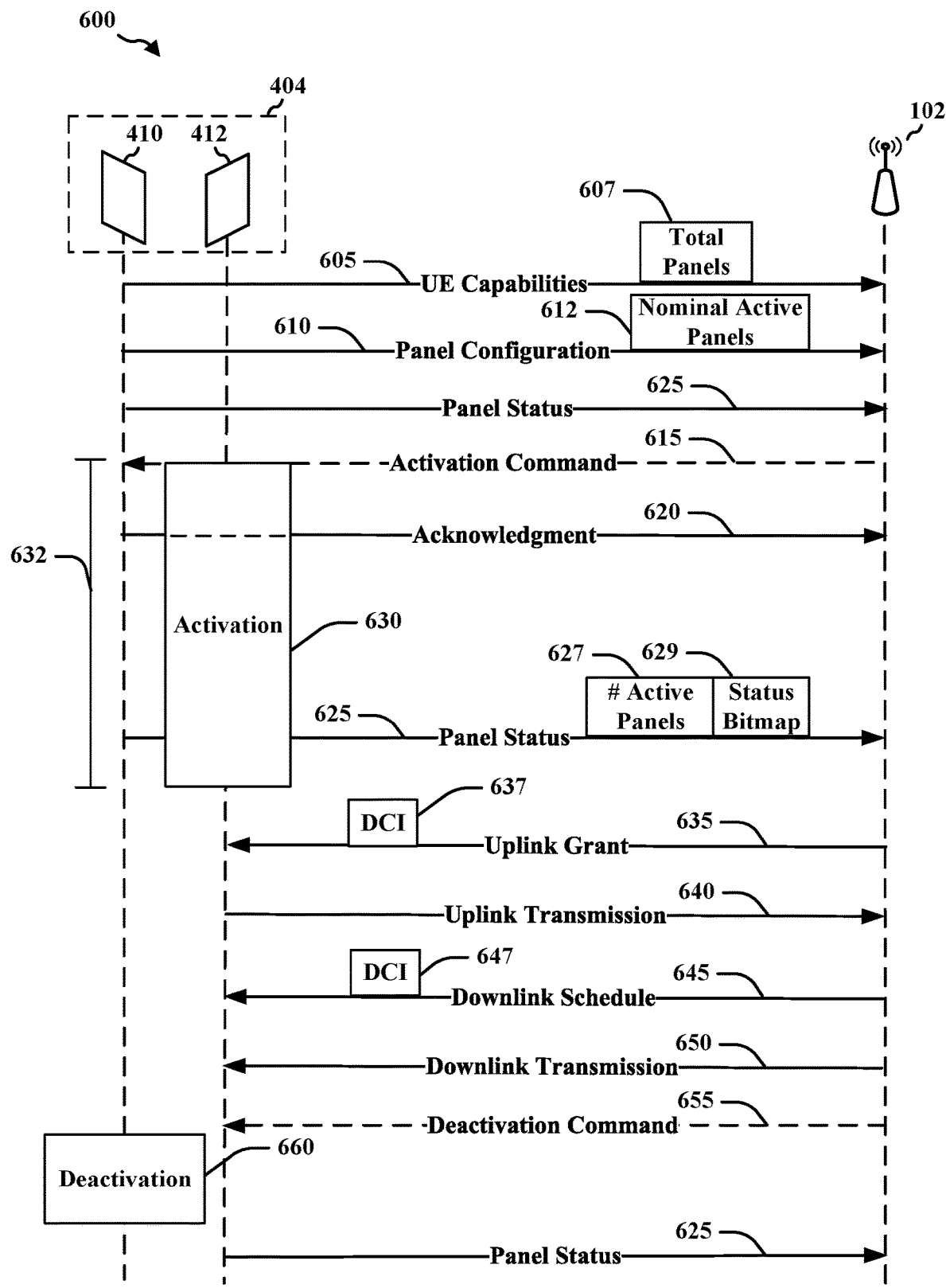
FIG. 6 is a message diagram showing example messages for activating and deactivating one or more panels of a multi-panel UE.

Turning to FIG. 6, an example message diagram 600 includes signaling messages that may be used to activate and/or deactivate one or more panels of an example MPUE 404.

The MPUE 404 may transmit UE capabilities 605, which may indicate that the MPUE 404 includes multiple panels. UE capabilities 605 may indicate a total number 607 of panels of the MPUE 404 and/or a maximum number of active panels. The UE capabilities 605 may be carried in an RRC configuration message.

The MPUE 404 may transmit a panel configuration message 610. The panel configuration message 610 may indicate a number of panels of the MPUE 404 and/or a maximum number of active panels. In an aspect, the panel configuration message 610 may indicate a nominal number of active panels 612, which may remain constant while the MPUE 404 is connected to the base station 102. As discussed in further detail below, the actual number of active panels at the MPUE 404 may change, and the MPUE 404 may manage a mapping of panel identifiers to the active panels. In an aspect, the panel configuration message 610 may indicate information regarding each panel. For example, the panel configuration message 610 may indicate sleep modes and corresponding activation times for each panel of the MPUE 404. The activation time may be a length of time for the MPUE 404 to transition the panel from the sleep mode to an active mode ready for transmission. For example, the activation time may be indicated as a number of milliseconds (ms) or as a number of slots for a given frame numerology. The activation time may be panel specific, that is, each panel 410, 412, 414 may have a different activation time. The activation time may also be mode specific. For example, the panel 410 may have an activation time from deep sleep mode, an activation time from light sleep mode, and an activation time for being selected as the transmitting panel. In an aspect, the panel configuration message 610 may be carried on an RRC connection setup message. In another aspect, the panel configuration message 610 may be transmitted on the uplink data channel. For example, in the case of dynamic panel configuration, the panel configuration message 610 may be transmitted on the uplink data channel outside of an RRC message.

In an aspect, the base station 102 may optionally transmit an activation command 615. The activation command 615 may indicate that the MPUE 404 should activate a number of panels or a specific panel according to an activation process 630. The activation process 630 may have an activation time 632, which may be panel-specific and/or status specific. In another aspect, the activation time 632 may be the same for all UEs and panels, for example, as defined in a standards document or regulation. As illustrated, for example, the activation command 615 may be received by an active first panel 410 and indicate activation of the second panel 412. The base station 102 may determine to transmit the activation command 615 to improve UL channel conditions for the MPUE 404. For example, the base station 102 may measure the channel quality and/or beam quality of UL transmissions from the MPUE 404. In particular, in the absence of beam correspondence between UL and DL, the MPUE 404 may be unable to determine the best beam or panel for UL transmission. Accordingly, the base station 102 may transmit the activation command 615 to activate the panel having the best beam based on measurements by the base station 102.

In an aspect, the activation command 615 may be transmitted within downlink control information (DCI). For example, a DCI format may include one or more bits that indicate a panel ID for an indicated panel. The MPUE 404 may activate or deactivate the indicated panel based on the current status of the panel. As a physical layer signal, a DCI may not receive an acknowledgment. The base station 102 and the MPUE 404 may measure the activation time 632 for activation process 630 of the panel from a time slot of the DCI. In another aspect, the activation command may be transmitted as a media access control (MAC) control element (CE) (MAC-CE). The MAC-CE may include one or more panel IDs and a new status for each panel ID. The MPUE 404 may acknowledge receipt of the MAC-CE by transmitting an acknowledgment 620 from a currently active panel (e.g., an active first panel 410). The base station 102 and the MPUE 404 may measure the activation time 632 of the activation process 630 for the panel from the time of the acknowledgment 620.

The MPUE 404 may transmit a panel status message 625. The panel status message 625 may indicate a current status of one or more of the panels 410, 412, 414. The panel status may change in response to an activation command 615 or a deactivation command 655. In an aspect, the panel status may change in response to a determination by the MPUE 404. For example, the MPUE 404 may determine to activate a new panel based on a maximum permissible exposure (MPE) limit affecting a currently active panel. For instance, if the current transmitting panel limits a transmission power due to an MPE limit, the MPUE 404 may activate another panel that may not be subject to the MPE limit, for example, because the other panel is not facing a user. As another example, the MPUE 404 may determine to deactivate a panel that is not being used. For example, if the base station 102 has scheduled the panel 410 for uplink transmissions, the MPUE 404 may determine to deactivate the panel 412 in order to save power. The panel status message 625 may be transmitted after any change to the status of a panel.

The panel status message 625 may be transmitted on the PUCCH. For example, the MPUE 404 may transmit one or more bits indicating the status of one or more panels. In an aspect, the PUCCH may include a panel ID and a panel status. In an aspect, a single bit could be transmitted to indicate whether the panel is active or inactive. For example, the MPUE 404 may transmit a status bitmap 629 with each bit indicating the status of a respective panel. In another aspect, the following table may indicate example panel status using two bits, for example.

| Panel Status | PUCCH content |
|---|---|
| Inactive and deep-sleep | 00 |
| Inactive and light-sleep | 01 |
| Active but not transmitting | 10 |
| Active and selected for transmission | 11 |

The current panel status may affect the activation time 632 of a panel as indicated by the panel configuration message 610. Accordingly, by transmitting a current panel status, both the MPUE 404 and the base station 102 may determine the correct activation time when a panel is activated.

An activation process 630 may be performed by the MPUE 404 to activate a panel from an inactive status such as a sleep mode. As discussed above, in an aspect, a panel may be placed in a deep-sleep mode or a light-sleep mode. The deep-sleep mode may provide greater power savings, but may have a longer activation time 632 than the light-sleep mode. For example, the panel may be turned off in the deep sleep mode. The light-sleep mode may have a shorter activation time 632, but may consume more power than the deep-sleep mode. For example, in the light-sleep mode, a panel may periodically perform channel estimates in order to select a beam. The activation process 630 may include one or more of: providing power to the panel, receiving reference signals, determining channel estimates, selecting beams, determining transmission power levels, and/or transmitting reference signals. The MPUE 404 may transmit a panel status message 625 after activating a panel.

The base station 102 may transmit an uplink grant 635 for the MPUE 404. The uplink grant 635 may indicate a panel for an uplink transmission 640. For example, the uplink grant 635 may include a panel ID of a selected panel. The base station 102 may select the panel based on active panels indicated by the most recent panel status message 625. In an aspect, the uplink grant 635 may be transmitted as a DCI 637.

The MPUE 404 may transmit an uplink transmission 640 based on the uplink grant 635. For example, the MPUE 404 may transmit the uplink transmission 640 from the indicated panel (e.g., second panel 412).

The base station 102 may transmit a downlink schedule 645 for the MPUE 404. The downlink schedule 645 may indicate a panel for a downlink transmission 650. For example, the a downlink schedule 645 may include a panel ID of a selected panel. The base station 102 may select the panel based on active panels indicated by the most recent panel status message 625. In an aspect, the a downlink schedule 645 may be transmitted as a DCI 647.

The MPUE 404 may receive a downlink transmission 650 based on the downlink schedule 645. For example, the MPUE 404 may receive the downlink transmission 650 via the indicated panel (e.g., second panel 412).

In an aspect, the base station 102 may optionally transmit a deactivation command 655 indicating that the MPUE 404 should place a panel into a sleep mode. The base station may transmit the deactivation command 655 when the panel status message 625 indicates the status of each panel. The base station 102 may have information that is useful for determining whether to place a panel in a sleep mode. For example, the base station 102 may measure uplink beam quality and may identify a panel that is experiencing adverse pathloss or a low-quality channel. Accordingly, the base station 102 may send the deactivation command 655 for a panel corresponding to an uplink beam. As another example, the base station 102 may be able to determine whether an uplink beam is causing interference to a transmission from another UE. Accordingly, the base station 102 may send the deactivation command 655 to mitigate interference.

The MPUE 404 may perform a deactivation process 660. The deactivation process 660 may be in response to the deactivation command 655, or may be based on a determination by the MPUE 404 to deactivate a panel. For example, as illustrated, the MPUE 404 may determine to deactivate the panel 410. Although the deactivation process 660 may occur over a period of time, the deactivation time may not necessarily be tracked or signaled because the deactivated panel may not be expected to do anything once deactivated. Accordingly, the base station 102 and/or the MPUE 404 may assume the panel is deactivated at the start of the deactivation process 660. The MPUE 404 may, however, transmit a panel status message 625 to indicate that a panel is deactivated, for example, when the MPUE 404 determines to deactivate the panel.

Figure 7:
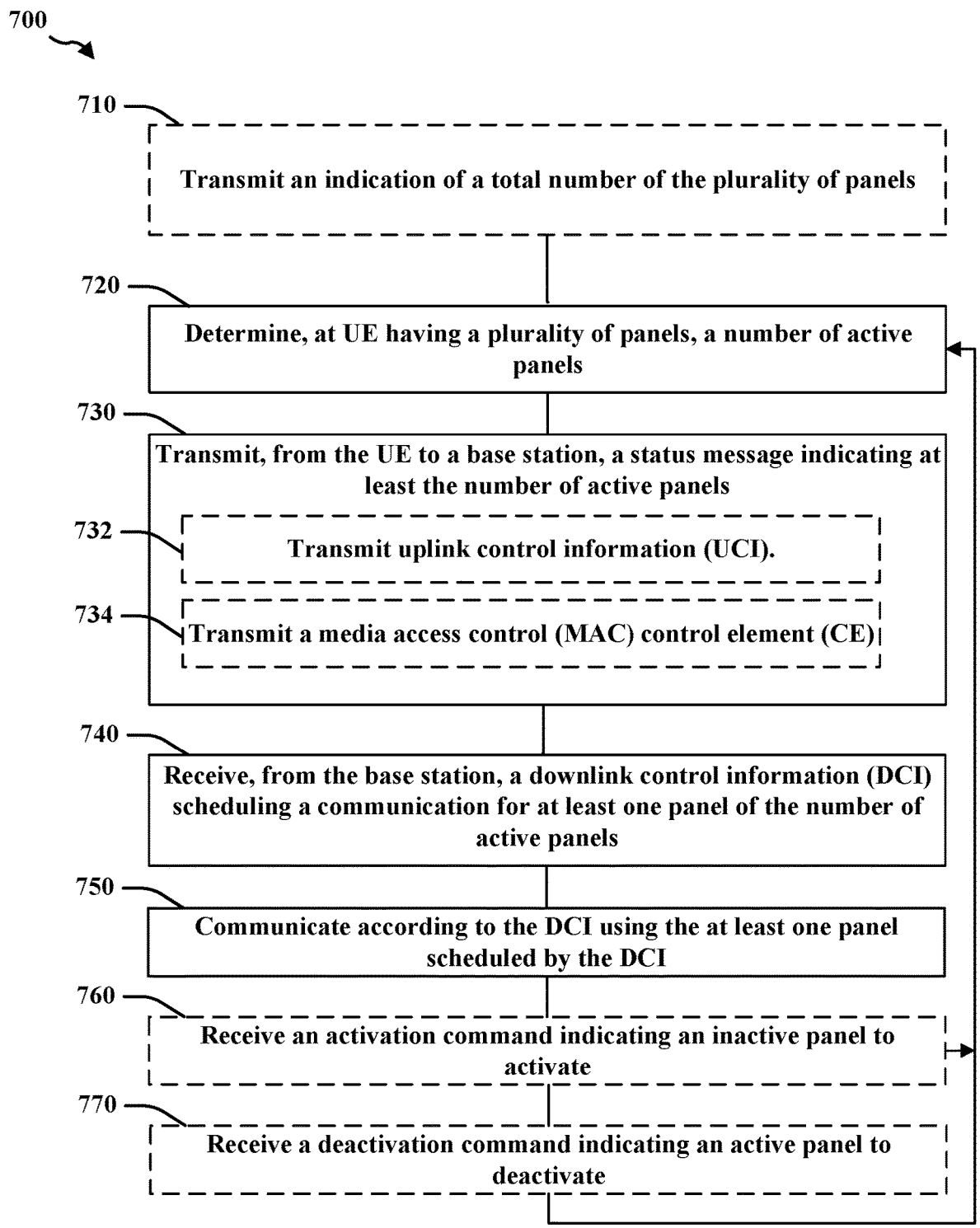
FIG. 7 is a flowchart of an example method of wireless communication for a UE using explicit status signaling.

FIG. 7 is a flowchart of an example method 700 of wireless communication. The method 700 may be performed by a UE (e.g., the UE 104, which may include the memory 360 and which may be the entire UE 104 or a component of the UE 104 such as the panel control component 140, the TX processor 368, the RX processor 356, or the controller/processor 359) or the MPUE 404, 504, which may also include a panel control component 140). The UE performing the method 700 may include at least a first panel (e.g., panel 410) and a second panel (e.g., panel 412). Dashed lines indicate an optional block.

At block 710, the method 700 may optionally include transmitting an indication of a total number of the plurality of panels. In an aspect, for example, the UE 104, the TX processor 368, and/or the controller/processor 359 may execute the panel control component 140 and/or the configuration component 142 to transmit the indication of the total number 607 of the plurality of panels. Accordingly, the UE 104, the TX processor 368, and/or the controller/processor 359 executing the panel control component 140 and/or the configuration component 142 may provide means for transmitting an indication of a total number of the plurality of panels.

At block 720, the method 700 may include determining, at UE having a plurality of panels, a number of active panels. In an aspect, for example, the UE 104, the TX processor 368, and/or the controller/processor 359 may execute the panel control component 140 and/or the activation-deactivation component 144 to determine, at the MPUE 404 having a plurality of panels 410, 412, a number of active panels 627. Accordingly, the UE 104, the TX processor 368, and/or the controller/processor 359 executing the panel control component 140 and/or the activation-deactivation component 144 may provide means for determining, at UE having a plurality of panels, a number of active panels.

At block 730, the method 700 may include transmitting, from the UE to a base station, a status message indicating at least the number of active panels. In an aspect, for example, the UE 104, the TX processor 368, and/or the controller/processor 359 may execute the panel control component 140 and/or the status component 146 to transmit, from the MPUE 404 to the base station 102, the panel status message 625 indicating at least the number of active panels 627. In sub-block 732, the block 730 may include transmitting an uplink control information (UCI). For example, the panel status message 625 may be carried in the UCI portion of the PUCCH. In sub-block 734, the block 730 may include transmitting a MAC-CE. For example, the panel status message 625 may be carried in a MAC-CE. In an aspect, the panel status message 625 indicates a status of each of the plurality of panels. For example, the panel status message 625 may include a status bitmap 629. Each bit field (e.g., 1 or 2 bits) of the status bitmap 629 may correspond to a status of one of the plurality of panels. Accordingly, the number of bits indicating active status may indicate the number of active panels. In view of the foregoing, the UE 104, the TX processor 368, and/or the controller/processor 359 executing the panel control component 140 and/or the status component 146 may provide means for transmitting, from the UE to a base station, a status message indicating at least the number of active panels.

At block 740, the method 700 may include receiving, from the base station, a DCI scheduling a communication for at least one of the number of active panels. In an aspect, for example, the UE 104, the RX processor 356, and/or the controller/processor 359 may execute the panel control component 140 and/or the communication component 148 to receive, from the base station 102, the DCI 637, 647 scheduling a communication for at least one of the number of active panels 627. Accordingly, the UE 104, the RX processor 356, and/or the controller/processor 359 executing the panel control component 140 and/or the communication component 148 may provide means for receiving, from the base station, a DCI scheduling a communication for at least one of the number of active panels.

At block 750, the method 700 may include communicating according to the DCI using the at least one panel scheduled by the DCI. In an aspect, for example, the UE 104, the RX processor 356, the TX processor 368, and/or the controller/processor 359 may execute the panel control component 140 and/or the communication component 148 to communicate according to the DCI using the at least one panel scheduled by the DCI. For example, the communication component 148 may transmit the uplink transmission 640 or receive the downlink transmission 650. Accordingly, the UE 104, the RX processor 356, the TX processor 368, and/or the controller/processor 359 executing the panel control component 140 and/or the communication component 148 may provide means for communicating according to the DCI using the at least one panel scheduled by the DCI.

At block 760, the method 700 may optionally include receiving an activation command indicating an inactive panel to activate. In an aspect, for example, the UE 104, the TX processor 368, and/or the controller/processor 359 may execute the panel control component 140 and/or the activation-deactivation component 144 to receive the activation command 615 indicating an inactive panel (e.g., panel 412) to activate. In an aspect, the activation command 615 may be received when the panel status message 625 includes the status bitmap 629 that allows the base station to determine which panel to activate. In another aspect, the activation command 615 may indicate to increase the number of active panels without identifying a specific panel to activate. The activation-deactivation component 144 may activate a panel in response to the activation command 615. In an aspect, the activation-deactivation component 144 may determine to activate a panel without receiving a command. The method 700 may return to block 720 after activating a panel to update the panel activation status, or proceed to block 770.

Accordingly, the UE 104, the RX processor 356, and/or the controller/processor 359 executing the panel control component 140 and/or the activation-deactivation component 144 may provide means for receiving an activation command indicating an inactive panel to activate.

At block 770, the method 700 may optionally include receiving a deactivation command indicating an active panel to deactivate. In an aspect, for example, the UE 104, the RX processor 356, and/or the controller/processor 359 may execute the panel control component 140 and/or the activation-deactivation component 144 to receive the deactivation command 655 indicating an active panel (e.g., panel 410) to deactivate. In an aspect, the deactivation command 655 may be received when the panel status message 625 includes the status bitmap 629 that allows the base station to determine which panel to deactivate. In another aspect, the deactivation command 655 may indicate to decrease the number of active panels without identifying a specific panel to activate. The activation-deactivation component 144 may deactivate a panel in response to the deactivation command 655. In an aspect, the activation-deactivation component 144 may determine to deactivate a panel without receiving a command. The method 700 may return to block 720 after deactivating a panel to update the panel activation status. Accordingly, the UE 104, the RX processor 356, and/or the controller/processor 359 executing the panel control component 140, and/or the activation-deactivation component 144 may provide means for receiving a deactivation command indicating an active panel to deactivate.

Figure 8:
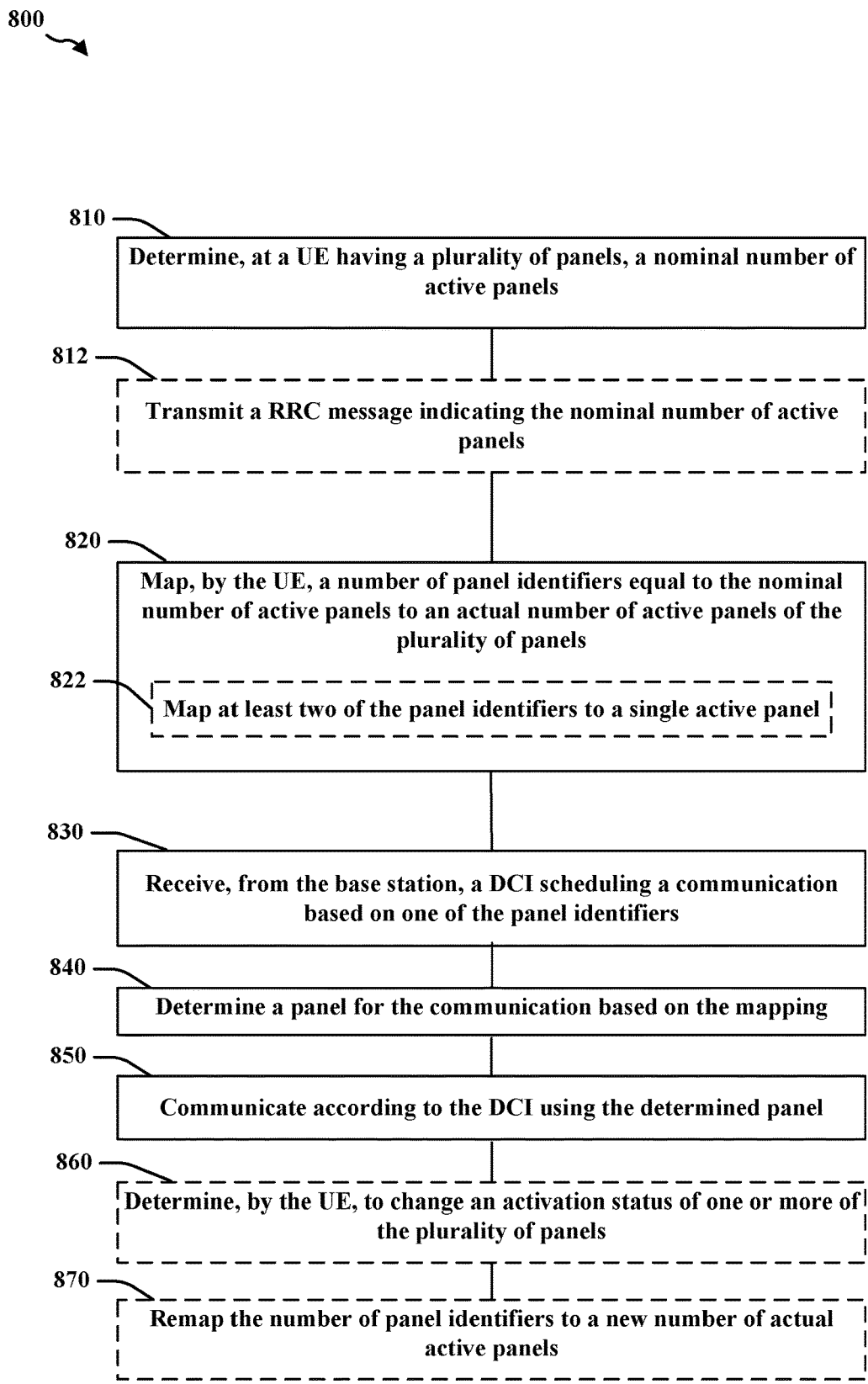
FIG. 8 is a flowchart of an example method of wireless communication for a UE using implicit status signaling.

FIG. 8 is a flowchart of an example method 800 of wireless communication. The method 800 may be performed by a UE (e.g., the UE, which may include the memory 360 and which may be the entire UE 104 or a component of the UE 104 such as the panel control component 140, the TX processor 368, the RX processor 356, or the controller/processor 359) or the MPUE 404, 504, which may also include a panel control component 140). The UE performing the method 800 may include at least a first panel (e.g., panel 410) and a second panel (e.g., panel 412). Dashed lines indicate an optional block.

At block 810, the method 800 may include determining, at a UE having a plurality of panels, a nominal number of active panels. In an aspect, for example, the UE 104, the TX processor 368, and/or the controller/processor 359 may execute the panel control component 140 and/or the configuration component 142 to determine, at the MPUE 404 having a plurality of panels 410, 412, a nominal number of active panels 612. For example, the configuration component 142 may select the number of active panels based on an actual number of panels, a current number of active panels, a maximum number of active panels, or a desired number of active panels (e.g., for power management). Accordingly, the UE 104, the TX processor 368, and/or the controller/processor 359 executing the panel control component 140, and/or the configuration component 142 may provide means for determining, at a UE having a plurality of panels, a nominal number of active panels.

At block 812, the block 810 may optionally include transmitting a RRC message indicating the nominal number of active panels. For example, the UE 104, the TX processor 368, and/or the controller/processor 359 may execute the panel control component 140 and/or configuration component 142 to transmit the panel configuration message 610 indicating the nominal number of active panels 612. In an aspect, the nominal number of active panels 612 may alternatively be transmitted as a UE capability 605. Accordingly, the UE 104, the TX processor 368, and/or the controller/processor 359 executing the panel control component 140, and/or the configuration component 142 may provide means for transmitting a RRC message indicating the nominal number of active panels.

At block 820, the method 800 may include mapping by the UE, a number of panel identifiers equal to the nominal number of active panels to an actual number of active panels of the plurality of panels. In an aspect, for example, the UE 104, the RX processor 356, and/or the controller/processor 359 may execute the panel control component 140 and/or the status component 146 to map a number of panel identifiers equal to the nominal number of active panels 612 to an actual number of active panels of the plurality of panels. For instance, if the nominal number of active panels is equal to the actual number of active panels, the status component 146 may map one panel identifier to each active panel. If the nominal number of active panels is greater than the actual number of active panels, the status component 146 may map multiple panel identifiers to one or more of the active panels. For example, at sub-block 822, the block 820 may optionally include mapping at least two of the panel identifiers to a single active panel. In another aspect, if the nominal number of active panels is less than the number of active panels, the status component 146 may map the same panel identifier to multiple active panels. Accordingly, the UE 104, the RX processor 356, and/or the controller/processor 359 executing the panel control component 140, and/or the status component 146 may provide means for mapping by the UE, a number of panel identifiers equal to the nominal number of active panels to an actual number of active panels of the plurality of panels.

At block 830, the method 800 may include receiving, from the base station, a DCI scheduling a communication based on one of the panel identifiers. In an aspect, for example, the UE 104, the RX processor 356, and/or the controller/processor 359 may execute the panel control component 140 and/or the communication component 148 to receive, from the base station 102, a DCI 637, 647 scheduling a communication (e.g., uplink transmission 640 or downlink transmission 650) based on one of the panel identifiers. For instance, the DCI 637, 647 may include the panel identifier, time-frequency resources, and other transmission properties. Accordingly, the UE 104, the RX processor 356, and/or the controller/processor 359 executing the panel control component 140, and/or the communication component 148 may provide means for receiving, from the base station, a DCI scheduling a communication based on one of the panel identifiers.

At block 840, the method 800 may include determining a panel for the communication based on the mapping. In an aspect, for example, the UE 104, the RX processor 356, and/or the controller/processor 359 may execute the panel control component 140 and/or the communication component 148 to determine the panel for the communication based on the mapping. The communication component 148 may transmit or receive the communication using the determined panel. Accordingly, the UE 104, the RX processor 356, and/or the controller/processor 359 executing the panel control component 140, and/or the communication component 148 may provide means for determining a panel for the communication based on the mapping.

At block 850, the method 800 may include communicating according to the DCI using the determined panel. In an aspect, for example, the UE 104, the RX processor 356, the TX processor 368, and/or the controller/processor 359 may execute the panel control component 140 and/or the communication component 148 to communicate according to the DCI using the determined panel. For example, the communication component 148 may transmit the uplink transmission 640 or receive the downlink transmission 650.

Accordingly, the UE 104, the RX processor 356, the TX processor 368, and/or the controller/processor 359 executing the panel control component 140, and/or the communication component 148 may provide means for communicating according to the DCI using the determined panel.

At block 860, the method 800 may optionally include determining, by the UE, to change an activation status of one or more of the plurality of panels. In an aspect, for example, the UE 104, the RX processor 356, and/or the controller/processor 359 may execute the panel control component 140 and/or the activation-deactivation component 144 to determine to change an activation status of one or more of the plurality of panels. In an aspect, when the MPUE 404 transmits the nominal number of active panels 612, the base station 102 may be unable to activate or deactivate panel. Instead, the MPUE 404 may be responsible for panel activation and deactivation. Accordingly, the UE 104, the RX processor 356, and/or the controller/processor 359 executing the panel control component 140, and/or the activation-deactivation component 144 may provide means for determining, by the UE, to change an activation status of one or more of the plurality of panels.

At block 870, the method 800 may optionally include remapping the number of panel identifiers to a new number of actual active panels. For example, the UE 104, the RX processor 356, and/or the controller/processor 359 may execute the panel control component 140 and/or the status component 146 to remap the number of panel identifiers to the new number of actual active panels. Accordingly, when the MPUE 404 receives a DCI indicating a panel, the communication component 148 may determine a panel to use for the communication. The MPUE 404 may not transmit a panel status message 625 to the base station 102, but may implicitly handle the mapping of panel identifiers to active panels. Accordingly, the UE 104, the RX processor 356, and/or the controller/processor 359 executing the panel control component 140, and/or the status component 146 may provide means for remapping the number of panel identifiers to a new number of actual active panels.

Figure 9:
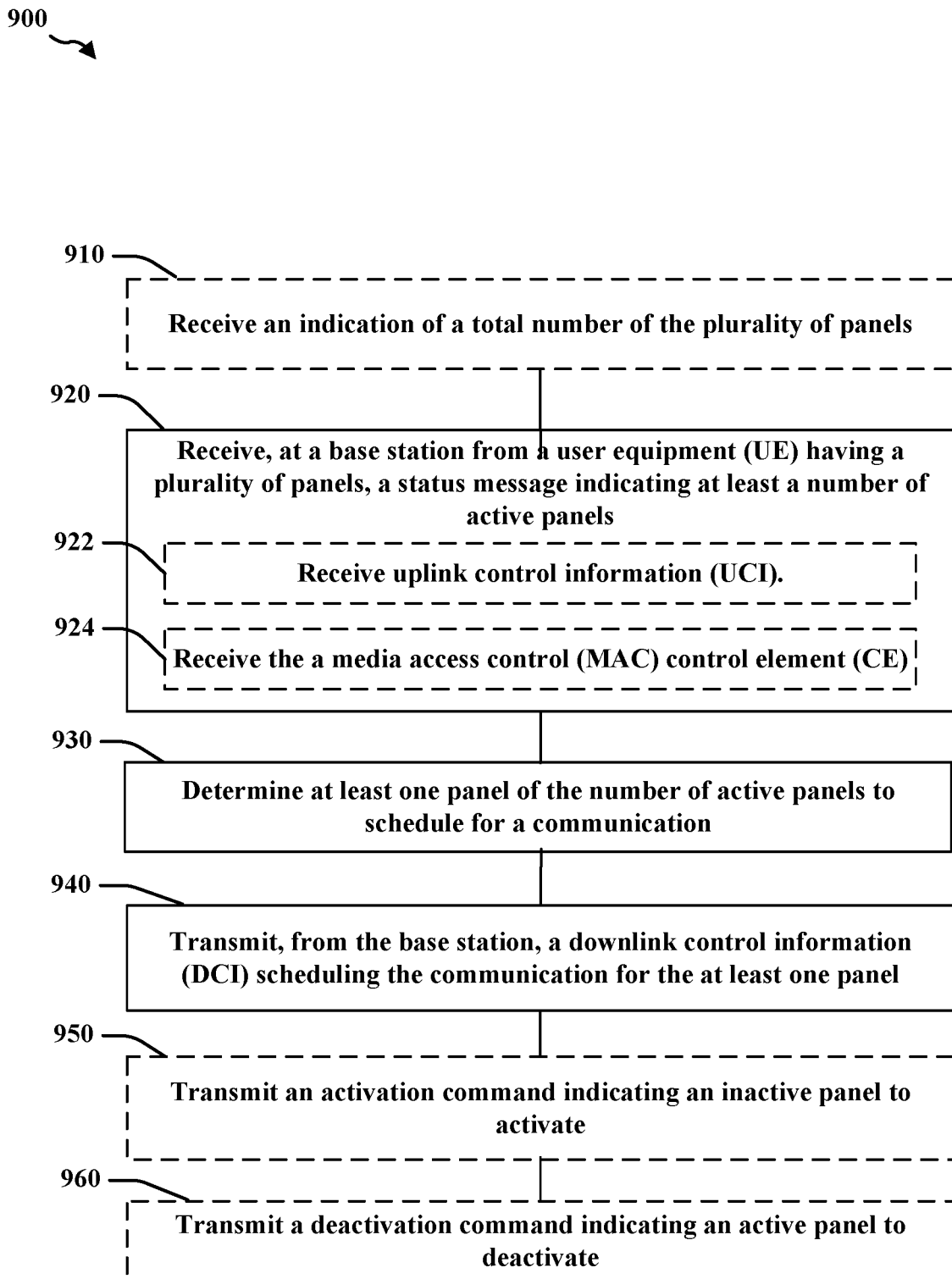
FIG. 9 is a flowchart of an example method of wireless communication for a base station using explicit status signaling.

FIG. 9 is a flowchart of an example method 900 of wireless communication. The method 900 may be performed by a base station (such as the base station 102, which may include the memory 376 and which may be the entire base station 102 or a component of the base station 102 such as the multi-panel component 198, TX processor 316, the RX processor 370, or the controller/processor 375). The method 900 may be performed in communication with an MPUE 404 including a plurality of panels such as at least a first panel (e.g., panel 410) and a second panel (e.g., panel 412). Dashed lines indicate an optional block.

At block 910, the method 900 may optionally include receiving an indication of a total number of the plurality of panels. In an aspect, for example, the base station 102, the controller/processor 375, and/or the RX processor 370 may execute the multi-panel component 198 and/or the configuration component 1242 to receive an indication of a total number 607 of the plurality of panel. For example, the total number 607 of the plurality of panels may be received as a UE capability 605 or a panel configuration message 610. Accordingly, the base station 102, the controller/processor 375, and/or the RX processor 370 executing the multi-panel component 198 and/or the configuration component 1242 may provide means for receiving an indication of a total number of the plurality of panels.

At block 920, the method 900 may include receiving, at a base station from a user equipment (UE) having a plurality of panels, a status message indicating at least a number of active panels. In an aspect, for example, the base station 102, the controller/processor 375, and/or the RX processor 370 may execute the multi-panel component 198 and/or the status component 1244 to receive, at the base station 102 from the MPUE 404 having a plurality of panels, the panel status message 625 indicating at least a number of active panels 627. For example, at sub-block 922, the status component 1244 may receive the panel status message 625 in a UCI. As another example, at sub-block 924, the status component 1244 may receive the panel status message 625 as a MAC-CE. In an aspect, the panel status message 625 indicates a status of each of the plurality of panels. For example, the panel status message 625 may include a status bitmap 629. Each bit of the status bitmap 629 may correspond to a respective status of one of the plurality of panels. Accordingly, the number of bits indicating active status may indicate the number of active panels. Accordingly, the base station 102, the controller/processor 375, and/or the RX processor 370 executing the multi-panel component 198 and/or the status component 1244 may provide means for receiving, at a base station from a UE having a plurality of panels, a status message indicating at least a number of active panels.

At block 930, the method 900 may include determining at least one panel of the number of active panels to schedule for a communication. In an aspect, for example, the base station 102, the controller/processor 375, and/or the RX processor 370 may execute the multi-panel component 198 and/or the scheduling component 1248 to determine at least one panel of the number of active panels to schedule for a communication. Accordingly, the base station 102, the controller/processor 375, and/or the RX processor 370 executing the multi-panel component 198 and/or the scheduling component 1248 may provide means for determining at least one panel of the number of active panels to schedule for a communication.

At block 940, the method 900 may include transmitting, from the base station, a DCI scheduling the communication for the at least one panel. In an aspect, for example, the base station 102, the controller/processor 375, and/or the RX processor 370 may execute the multi-panel component 198 and/or the scheduling component 1248 to transmit, from the base station, the DCI 637, 647 scheduling the communication (e.g., uplink transmission 640 or downlink transmission 650) for the at least one panel. Accordingly, the base station 102, the controller/processor 375, and/or the RX processor 370 executing the multi-panel component 198 and/or the scheduling component 1248 may provide means for transmitting, from the base station, a DCI scheduling the communication for the at least one panel.

At block 950, the method 900 may optionally include transmitting an activation command indicating an inactive panel to activate. In an aspect, for example, the base station 102, the controller/processor 375, and/or the RX processor 370 may execute the multi-panel component 198 and/or the activation-deactivation component 1246 to transmit the activation command 615 indicating an inactive panel (e.g., panel 412) to activate. In an aspect, the activation command 615 may be transmitted when the panel status message 625 includes the status bitmap 629 that allows the activation-deactivation component 1246 to determine which panel to activate. In another aspect, the activation command 615 may indicate to increase the number of active panels without identifying a specific panel to activate. The method 900 may return to block 920 after activating a panel to update the panel activation status. Accordingly, the base station 102, the controller/processor 375, and/or the RX processor 370 executing the multi-panel component 198 and/or the activation-deactivation component 1246 may provide means for transmitting an activation command indicating an inactive panel to activate.

At block 960, the method 900 may optionally include transmitting a deactivation command indicating an active panel to deactivate. In an aspect, for example, the base station 102, the controller/processor 375, and/or the RX processor 370 may execute the multi-panel component 198 and/or the activation-deactivation component 1246 to transmit the deactivation command 655 indicating an active panel (e.g., panel 410) to deactivate. In an aspect, the deactivation command 655 may be transmitted when the panel status message 625 includes the status bitmap 629 that allows the activation-deactivation component 1246 to determine which panel to deactivate. In another aspect, the deactivation command 655 may indicate to decrease the number of active panels without identifying a specific panel to deactivate. The method 900 may return to block 920 after deactivating a panel to update the panel activation status. Accordingly, the base station 102, the controller/processor 375, and/or the RX processor 370 executing the multi-panel component 198 and/or the activation-deactivation component 1246 may provide means for transmitting a deactivation command indicating an active panel to deactivate.

Figure 10:
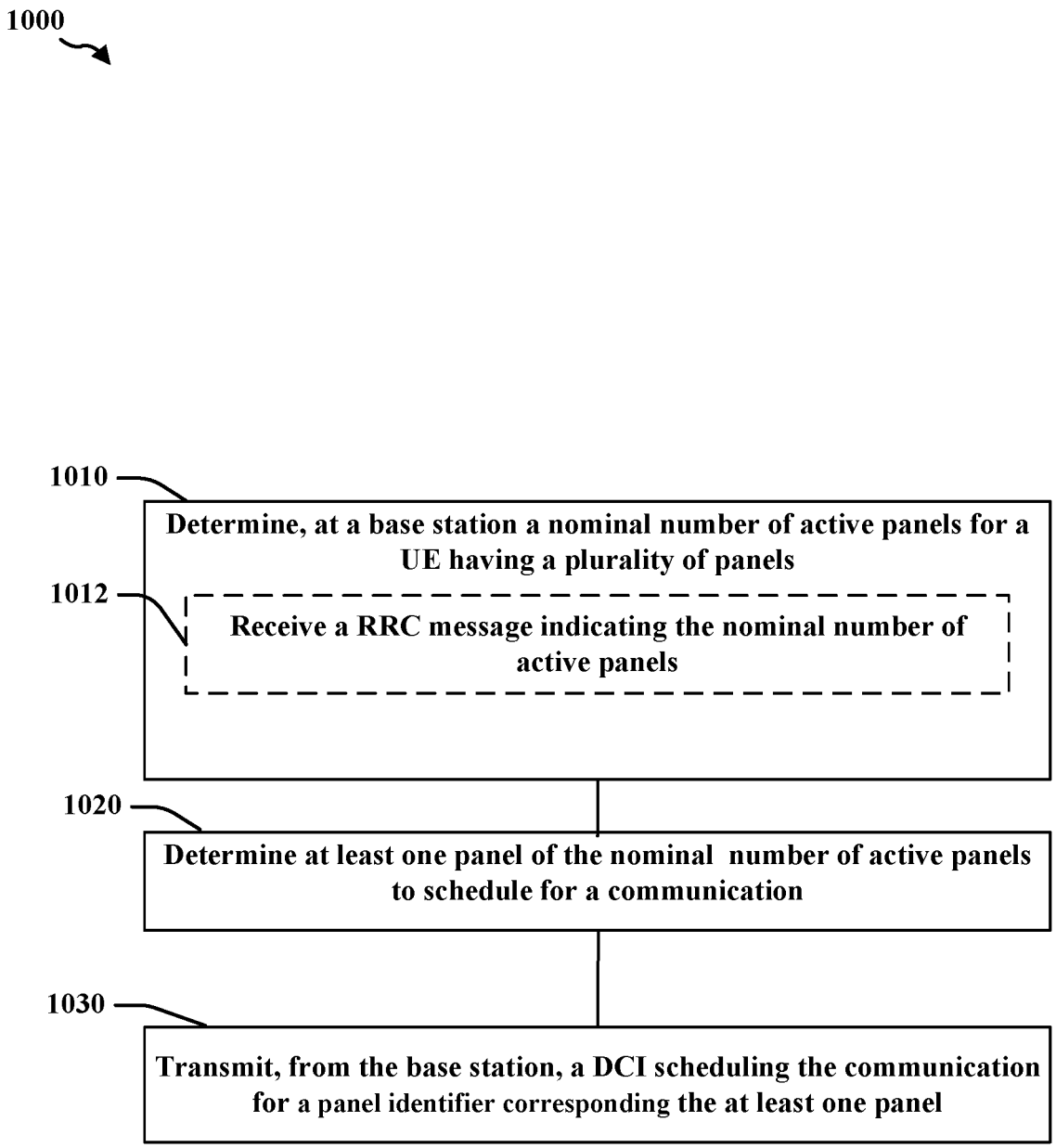
FIG. 10 is a flowchart of an example method of wireless communication for a base station using implicit status signaling.

FIG. 10 is a flowchart of an example method 1000 of wireless communication. The method 1000 may be performed by a base station (e.g., the base station 102 including the multi-panel component 198). The method 1000 may be performed in communication with an MPUE 404 including a plurality of panels such as at least a first panel (e.g., panel 410) and a second panel (e.g., panel 412). Dashed lines indicate an optional block.

At block 1010, the method 1000 may include determining, at a base station a nominal number of active panels for a UE having a plurality of panels. In an aspect, for example, the base station 102, the controller/processor 375, and/or the RX processor 370 may execute the multi-panel component 198 and/or the configuration component 1242 to determine, at the base station 102, the nominal number of active panels 612 for the MPUE 404 having a plurality of panels. For example, at sub-block 1012, the block 1010 may optionally include receiving a RRC message indicating the nominal number of active panels. For instance, the configuration component 1242 may receive the panel configuration message 610 indicating the nominal number of active panels 612. Alternatively, the configuration component 1242 may receive a UE capability 605 indicating the nominal number of active panels 612. Accordingly, the base station 102, the controller/processor 375, and/or the RX processor 370 executing the multi-panel component 198 and/or the configuration component 1242 may provide means for determining, at a base station a nominal number of active panels for a UE having a plurality of panels.

At block 1020, the method 1000 may include determining at least one panel of the nominal number of active panels to schedule for a communication. In an aspect, for example, the base station 102, the controller/processor 375, and/or the RX processor 370 may execute the multi-panel component 198 and/or the scheduling component 1248 to determine at least one panel of the nominal number of active panels 612 to schedule for a communication (e.g., uplink transmission 640 or downlink transmission 650). Accordingly, the base station 102, the controller/processor 375, and/or the RX processor 370 executing the multi-panel component 198 and/or the scheduling component 1248 may provide means for determining at least one panel of the nominal number of active panels to schedule for a communication.

At block 1030, the method 1000 may include transmitting, from the base station, a DCI scheduling the communication for the at least one panel. In an aspect, for example, the base station 102, the controller/processor 375, and/or the TX processor 316 may execute the multi-panel component 198 and/or the scheduling component 1248 to transmit, from the base station 102, the DCI 637, 647 scheduling the communication for the at least one panel. Accordingly, the base station 102, the controller/processor 375, and/or the TX processor 316 executing the multi-panel component 198 and/or the scheduling component 1248 may provide means for transmitting, from the base station, a DCI scheduling the communication for the at least one panel.

Figure 11:
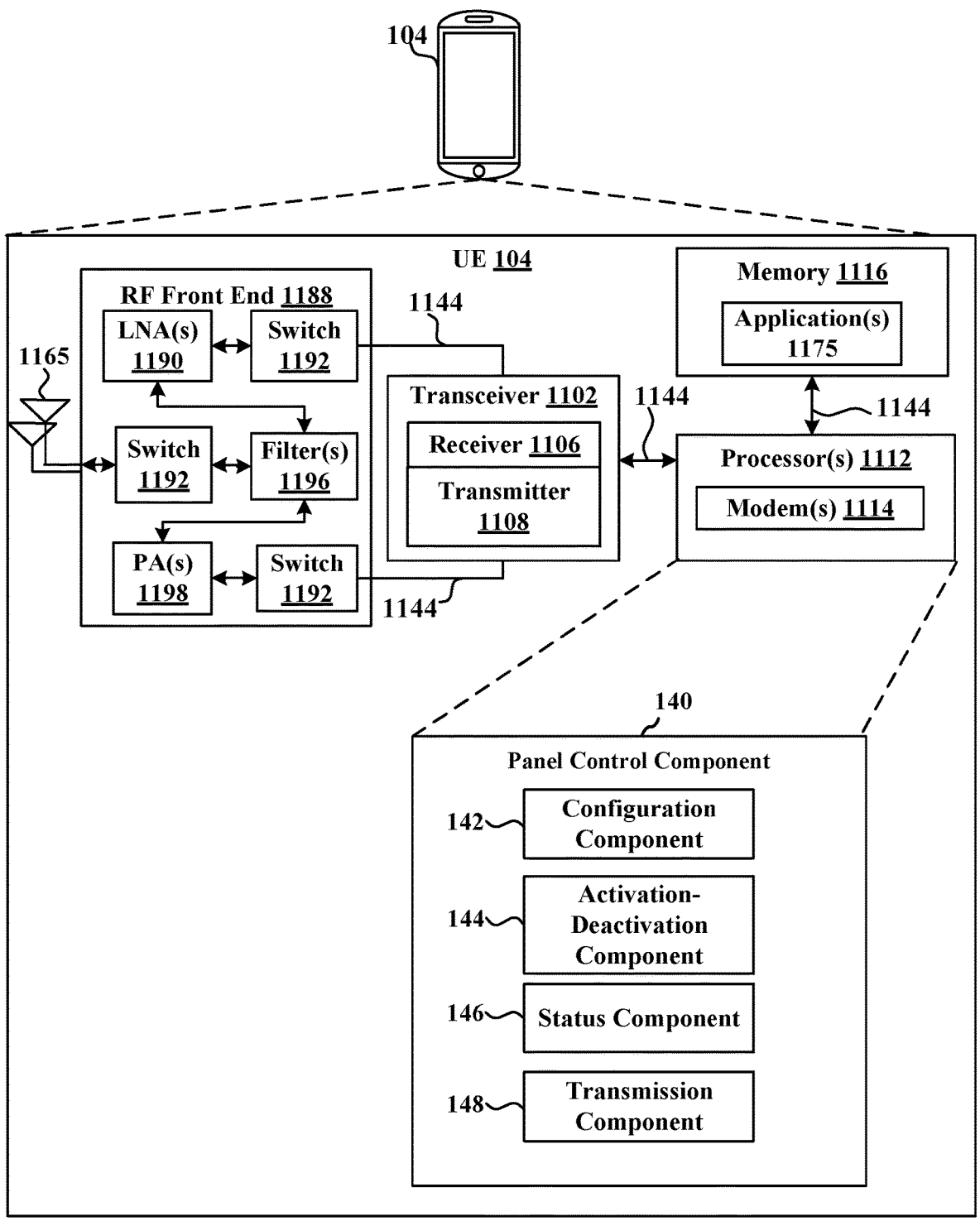
FIG. 11 is a schematic diagram of example components of the UE of FIG. 1.

Referring to FIG. 11, one example of an implementation of UE 104 may include a variety of components, some of which have already been described above, but including components such as one or more processors 1112 and memory 1116 and transceiver 1102 in communication via one or more buses 1144, which may operate in conjunction with modem 1114 and panel control component 140 to enable one or more of the functions described herein related to signaling for panel activation. Further, the one or more processors 1112, modem 1114, memory 1116, transceiver 1102, RF front end 1188 and one or more antennas 1165, may be configured to support voice and/or data calls (simultaneously or non-simultaneously) in one or more radio access technologies. The antennas 1165 may include one or more antennas, antenna elements, and/or antenna arrays.

In an aspect, the one or more processors 1112 can include a modem 1114 that uses one or more modem processors. The various functions related to panel control component 140 may be included in modem 1114 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with panel control component 140 may be performed by transceiver 1102.

Also, memory 1116 may be configured to store data used herein and/or local versions of applications 1175 or panel control component 140 and/or one or more of the subcomponents thereof being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining panel control component 140 and/or one or more of the subcomponents thereof, and/or data associated therewith, when UE 104 is operating at least one processor 1112 to execute panel control component 140 and/or one or more of the subcomponents thereof.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and a corresponding specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and a corresponding specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver may be tuned to operate at specified frequencies such that UE 104 can communicate with, for example, one or more base stations 102 or one or more cells associated with one or more base stations 102. In an aspect, for example, modem 1114 can configure transceiver 1102 to operate at a specified frequency and power level based on the UE configuration of the UE 104 and the communication protocol used by modem 1114.

In an aspect, modem 1114 can be a multiband-multimode modem, which can process digital data and communicate with transceiver 1102 such that the digital data is sent and received using transceiver 1102. In an aspect, modem 1114 can be multiband and be configured to support multiple frequency bands for a specific communications protocol. In an aspect, modem 1114 can be multimode and be configured to support multiple operating networks and communications protocols. In an aspect, modem 1114 can control one or more components of UE 104 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Referring to FIG. 12, one example of an implementation of base station 102 may include a variety of components, some of which have already been described above, but including components such as one or more processors 1212 and memory 1216 and transceiver 1202 in communication via one or more buses 1254, which may operate in conjunction with modem 1214 and multi-panel component 198 to enable one or more of the functions described herein related to signaling panel activation.

The transceiver 1202, receiver 1206, transmitter 1208, one or more processors 1212, memory 1216, applications 1275, buses 1254, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

SOME FURTHER EXAMPLE EMBODIMENTS

A first example method of wireless communication, comprising: A method of wireless communication, comprising: determining, at a UE having a plurality of panels, a number of active panels; transmitting, from the UE to a base station, a status message indicating at least the number of active panels; receiving, from the base station, a DCI scheduling a communication for at least one panel of the number of active panels; and communicating according to the DCI using the at least one panel scheduled by the DCI.

The above first example method, wherein the status message indicates a status of each of the plurality of panels.

Any of the above first example methods, wherein the status message includes a bitmap, where each bit corresponds to a status of a respective one of the plurality of panels.

Any of the above first example methods, further comprising receiving an activation command indicating an inactive panel to activate.

Any of the above first example methods, further comprising receiving a deactivation command indicating an active panel to deactivate.

Any of the above first example methods, wherein transmitting the status message comprises transmitting UCI.

Any of the above first example methods, wherein transmitting the status message comprises transmitting a MAC-CE.

Any of the above first example methods, further comprising transmitting an indication of a total number of the plurality of panels.

A second example method of wireless communication, comprising: determining, at UE having a plurality of panels, a nominal number of active panels; mapping, by the UE, a number of panel identifiers equal to the nominal number of active panels to an actual number of active panels of the plurality of panels; receiving, from a base station, a DCI scheduling a communication based on one of the panel identifiers; determining a panel for the communication based on the mapping; and communicating according to the DCI using the determined panel.

The above second example method, further comprising transmitting a radio resource control (RRC) message to the base station indicating the nominal number of active panels.

Any of the above second example methods, wherein the nominal number of active panels remains the same while the UE is connected to the base station.

Any of the above second example methods, further comprising: determining, by the UE, to change an activation status of one or more of the plurality of panels; and remapping the number of panel identifiers to a new number of actual active panels.

Any of the above second example methods, wherein mapping the number of panel identifiers to the number of active panels comprises mapping at least two of the panel identifiers to a single active panel.

An apparatus for wireless communication, comprising: a memory; and at least one processor coupled with the memory and configured to perform any of the above first or second example methods.

An apparatus for wireless communication, comprising: means for performing any of the above first or second example methods.

A non-transitory computer-readable medium storing computer executable code, the code when executed by a processor cause the processor to perform any of the above first or second example methods.

A third example method of wireless communication, comprising: receiving, at a base station from a UE having a plurality of panels, a status message indicating at least a number of active panels; determining at least one panel of the number of active panels to schedule for a communication; and transmitting, from the base station, a DCI scheduling the communication for the at least one panel.

The above third example method, wherein the status message indicates a status of each of the plurality of panels.

Any of the above third example methods, wherein the status message includes a bitmap, where each bit of the bitmap corresponds to a respective status of one of the plurality of panels.

Any of the above third example methods, further comprising transmitting an activation command indicating an inactive panel to activate.

Any of the above third example methods, further comprising transmitting a deactivation command indicating an active panel to deactivate.

Any of the above third example methods, wherein receiving the status message comprises receiving UCI.

Any of the above third example methods, wherein receiving the status message comprises receiving a MAC-CE Any of the above third example methods, further comprising receiving an indication of a total number of the plurality of panels.

A fourth example method of wireless communication, comprising: determining, at a base station a nominal number of active panels for a UE having a plurality of panels; determining at least one panel of the nominal number of active panels to schedule for a communication; and transmitting, from the base station, a DCI scheduling a communication based a panel identifier corresponding to one of the nominal number of active panels.

The above fourth example method, wherein determining the nominal number of active panels comprises receiving a RRC message indicating the nominal number of active panels.

Any of the above fourth example methods, wherein the nominal number of active panels remains constant while the UE is connected to the base station.

An apparatus for wireless communication, comprising: a memory; and at least one processor coupled with the memory and configured to perform any of the above third or fourth example methods.

An apparatus for wireless communication, comprising means for performing any of the above third or fourth example methods.

A non-transitory computer-readable medium storing computer executable code, the code when executed by a processor cause the processor to perform any of the above third or fourth example methods.

What is claimed is:

1. A method of wireless communication, comprising:
   determining, at a user equipment (UE) having a plurality of panels, a number of active panels;
   transmitting, from the UE to a base station, a status message indicating at least the number of active panels, wherein the status message includes a bitmap, where each bit field of the bitmap corresponds to a status of a respective one of the plurality of panels, wherein the status of an inactive panel of the plurality of panels is represented by two bits, where a first bit indicates that the panel is inactive and a second bit indicates whether the inactive panel is in a deep-sleep mode or a light-sleep mode;
   receiving an activation command indicating to activate the inactive panel;
   measuring an activation time for the inactive panel to become a new active panel based on a sleep mode of the inactive panel, wherein the deep-sleep mode has a longer activation time than the light-sleep mode;
   receiving, from the base station after the activation time, a downlink control information (DCI) scheduling a communication for the new active panel; and
   communicating according to the DCI using at least the new active panel scheduled by the DCI.

2. The method of claim 1, further comprising receiving a deactivation command indicating an active panel to deactivate.

3. The method of claim 1, wherein transmitting the status message comprises transmitting uplink control information (UCI).

4. The method of claim 1, wherein transmitting the status message comprises transmitting a media access control (MAC) control element (CE).

5. The method of claim 1, further comprising transmitting an indication of a total number of the plurality of panels.

6. An apparatus for wireless communication, comprising:
   a memory storing computer-executable instructions; and
   at least one processor coupled with the memory and configured to execute the instructions to:
   determine, at a user equipment (UE) having a plurality of panels, a number of active panels;
   transmit, from the UE to a base station, a status message indicating at least the number of active panels, wherein the status message includes a bitmap, where each bit field of the bitmap corresponds to a status of a respective one of the plurality of panels, wherein the status of an inactive panel of the plurality of panels is represented by two bits, where a first bit indicates that the panel is inactive and a second bit indicates whether the inactive panel is in a deep-sleep mode or a light-sleep mode;
   receive an activation command indicating to activate the inactive panel;
   measure an activation time for the inactive panel to become a new active panel based on a sleep mode of the inactive panel, wherein the deep-sleep mode has a longer activation time than the light-sleep mode;
   receive, from the base station after the activation time, a downlink control information (DCI) scheduling a communication for the new active panel; and
   communicate according to the DCI using at least the new active panel scheduled by the DCI.

7. The apparatus of claim 6, wherein the at least one processor is configured to receive a deactivation command indicating an active panel to deactivate.

8. The apparatus of claim 6, wherein the at least one processor is configured to transmit the status message as one of an uplink control information (UCI) or a media access control (MAC) control element (CE).

9. The apparatus of claim 6, wherein the at least one processor is configured to transmit an indication of a total number of the plurality of panels.

10. A method of wireless communication, comprising:
    receiving, at a base station from a user equipment (UE) having a plurality of panels, a status message indicating at least a number of active panels, wherein the status message includes a bitmap, where each bit field of the bitmap corresponds to a status of a respective one of the plurality of panels, wherein the status of an inactive panel of the plurality of panels is represented by two bits, where a first bit indicates that the panel is inactive and a second bit indicates whether the inactive panel is in a deep-sleep mode or a light-sleep mode;
    transmitting an activation command indicating to activate the inactive panel;
    measuring an activation time for the inactive panel to become a new active panel based on a sleep mode of the inactive panel, wherein the deep-sleep mode has a longer activation time than the light-sleep mode;
    determining to schedule at least the new active panel for a communication; and
    transmitting, from the base station after the activation time, a downlink control information (DCI) scheduling the communication for at least the new active panel.

11. The method of claim 10, further comprising transmitting a deactivation command indicating an active panel to deactivate.

12. The method of claim 10, wherein receiving the status message comprises receiving uplink control information (UCI).

13. The method of claim 10, wherein receiving the status message comprises receiving a media access control (MAC) control element (CE).

14. The method of claim 10, further comprising receiving an indication of a total number of the plurality of panels.

15. An apparatus for wireless communication, comprising:
    a memory storing computer-executable instructions; and
    at least one processor coupled with the memory and configured to execute the instructions to:
    receive, at a base station from a user equipment (UE) having a plurality of panels, a status message indicating at least a number of active panels, wherein the status message includes a bitmap, where each bit field of the bitmap corresponds to a status of a respective one of the plurality of panels, wherein the status of an inactive panel of the plurality of panels is represented by two bits, where a first bit indicates that the panel is inactive and a second bit indicates whether the inactive panel is in a deep-sleep mode or a light-sleep mode;
    transmit an activation command indicating to activate the inactive panel;
    measure an activation time for the inactive panel to become a new active panel based on a sleep mode of the inactive panel, wherein the deep-sleep mode has a longer activation time than the light-sleep mode;
    determine to schedule at least the new active panel for a communication; and
    transmit, from the base station after the activation time, a downlink control information (DCI) scheduling the communication for at least the new active panel.

16. The apparatus of claim 15, wherein the at least one processor is configured to transmit a deactivation command indicating an active panel to deactivate.

17. The apparatus of claim 15, wherein the at least one processor is configured to receive the status message as one of an uplink control information (UCI) or a media access control (MAC) control element (CE).

18. The apparatus of claim 15, wherein the at least one processor is configured to receive an indication of a total number of the plurality of panels.

\* \* \* \* \*